United States Patent
Park et al.

(10) Patent No.: US 10,108,744 B2
(45) Date of Patent: Oct. 23, 2018

(54) ADMINISTRATIVE TOOL AND PHYSICAL EXECUTION PLAN INTERFACE FOR PLUG-IN ARCHITECTURE OF BUSINESS INTELLIGENCE PLATFORM USING DATA SOURCE CARTRIDGES

(71) Applicant: Oracle International Corporation, Redwood Shores, CA (US)

(72) Inventors: Hoyong Park, San Jose, CA (US); Roger Bolsius, Round Rock, TX (US); Ashok Kumar Dhakar, Bangalore (IN); Muthukumar Velusamy, Tamil Nadu (IN)

(73) Assignee: Oracle International Corporation, Redwood Shores, CA (US)

( * ) Notice: Subject to any disclaimer, the term of this patent is extended or adjusted under 35 U.S.C. 154(b) by 701 days.

(21) Appl. No.: 14/675,628

(22) Filed: Mar. 31, 2015

(65) Prior Publication Data

US 2016/0098492 A1    Apr. 7, 2016

Related U.S. Application Data (63) Continuation-in-part of application No. 14/508,148, filed on Oct. 7, 2014.

(51) Int. Cl.
*G06F 17/30* (2006.01)
(52) U.S. Cl.
CPC .. *G06F 17/30935* (2013.01); *G06F 17/30938* (2013.01)
(58) Field of Classification Search
CPC .................................................. G06F 3/1209
See application file for complete search history.

(56) References Cited

U.S. PATENT DOCUMENTS

| | | |
|---|---|---|
| 7,272,660 B1 | 9/2007 | Powers et al. |
| 7,523,118 B2 | 4/2009 | Friedlander et al. |
| 7,533,107 B2 | 5/2009 | Gupta et al. |
| 7,949,628 B1 | 5/2011 | Blazek et al. |

(Continued)

FOREIGN PATENT DOCUMENTS

WO    2000075849    12/2000

OTHER PUBLICATIONS

Data Direct Technologies; obtained at http://www.progress.com/~/media/DataDirect/Documents/Custom%20Driver%20SDK/integrate-data-source.pdf ; Apr. 2008; 3 pages.

(Continued)

*Primary Examiner* — Richard Bowen
(74) *Attorney, Agent, or Firm* — Trellis IP Law Group, PC (57) ABSTRACT

Embodiments implement a plug-in architecture supporting adding new data sources to a legacy federated database without the need to recode a federated database manager software module. The federated database manager software module includes an administrative tool and a plug-in framework for interfacing with a data source cartridge. The data source cartridge supplies metadata including a feature table of a newly added data source to the framework and creates a physical query for the newly added data source based on an execution plan generated by the federated database manager software module. The administrative tool generates presentation panes including new data sources added to the legacy federated database.

11 Claims, 8 Drawing Sheets

(56) References Cited

U.S. PATENT DOCUMENTS

| | | | |
|---|---|---|---|
| 8,412,746 B2 | 4/2013 | Fox et al. | |
| 8,572,035 B2 | 10/2013 | Cosic | |
| 9,244,971 B1* | 1/2016 | Kalki | G06F 17/30442 |
| 2002/0100027 A1* | 7/2002 | Binding | G06F 17/30893 |
| | | | 717/137 |
| 2004/0205691 A1* | 10/2004 | Poole | G06F 8/20 |
| | | | 717/100 |
| 2007/0174420 A1* | 7/2007 | Khusial | G06F 17/30893 |
| | | | 709/217 |
| 2007/0276851 A1* | 11/2007 | Friedlander | G06F 17/30592 |
| 2011/0161352 A1* | 6/2011 | de Castro Alves | |
| | | | G06F 17/30557 |
| | | | 707/769 |
| 2012/0278334 A1* | 11/2012 | Abjanic | G06F 17/30557 |
| | | | 707/741 |
| 2012/0284255 A1* | 11/2012 | Schechter | G06F 17/30398 |
| | | | 707/718 |
| 2013/0139096 A1* | 5/2013 | Rist | G06F 9/4443 |
| | | | 715/781 |
| 2014/0046978 A1 | 2/2014 | Krishnaprasad et al. | |
| 2015/0012476 A1* | 1/2015 | Seng | G06F 17/30563 |
| | | | 707/601 |
| 2015/0363435 A1* | 12/2015 | Ott | G06F 17/30294 |
| | | | 707/803 |
| 2016/0085828 A1* | 3/2016 | Nguyen | G06F 17/30545 |
| | | | 707/770 |
| 2016/0217058 A1* | 7/2016 | Kidron | G06F 9/543 |
| 2016/0246835 A1* | 8/2016 | Nguyen | G06F 17/30545 |

OTHER PUBLICATIONS

Novel Mediator Architectures for Grid Information Systems; obtained at http://www.sciencedirect.com/science/article/pii/S0167739X04001475; downloaded via circa May 30, 2014; 1 page.

Oracle Database—Data Cartridge Developers Guide; Mar. 2008; 372 pages.

* cited by examiner

Fig. 1

PRIOR ART

ADMINISTRATIVE TOOL AND PHYSICAL EXECUTION PLAN INTERFACE FOR PLUG-IN ARCHITECTURE OF BUSINESS INTELLIGENCE PLATFORM USING DATA SOURCE CARTRIDGES

CROSS REFERENCES TO RELATED APPLICATIONS

This application is a continuation-in-part of the following application, U.S. patent application Ser. No. 14/508,148, entitled PLUG-IN ARCHITECTURE OF BUSINESS INTELLIGENCE PLATFORM USING DATA SOURCE CARTRIDGES, filed on Oct. 7, 2014, which issued as U.S. Pat. No. 10,067,978 on Sep. 4, 2015, which is hereby incorporated by reference, as if it is set forth in full in this specification.

BACKGROUND

Many organizations today use a collection of Business Intelligence (BI) tools and applications to allow experts to gather information from a variety of sources, analyze the information, and share the information with managers and staff. Large business organizations include different divisions that will typically use different data sources to store and manage information.

Database federation is a technique for aggregating multiple data sources into a single virtual data source and creating a logical model to allow logical queries of the federated data source.

In a federated database environment, it is crucial to support new data sources to meet customer requirements in a timely manner. With the advent of cloud computing, there are more data sources to be supported by business intelligence tools.

Currently, the industry's answer to this problem is to provide an API for new data sources. However, most of the API's are targeted only to connectivity and do not allow leveraging the analytic capabilities of the BI tools.

Many computers provide products for implementing database federation capability. For example, Oracle Corporation provides a Business Intelligence Server (OBIS) that is a highly scalable, highly efficient query and analysis server that integrates data via sophisticated query federation capabilities from multiple relational, unstructured, OLAP, and pre-packaged application sources, whether Oracle or non-Oracle.

The OBIS exposes its services through standard ODBC and JDBC-compliant interfaces. Clients of the OBIS see a logical schema view independent of the source physical database schemas. OBIS clients submit "Logical" SQL, which ultimately gets translated by the server to native, source-specific data source query languages such as SQL and MDX. Intermediate processing to calculate complex business metrics and integrate multiple data sources occurs within the OBIS Execution Engine. The OBIS infrastructure includes facilities such as session and query management, cancellation, statistics logging, monitoring, and other server administration functions.

The addition of a new data source to OBIS requires adding additional code to an existing version. Typically new versions of OBIS are released that integrate new data sources into the federated database.

SUMMARY

In an example embodiment a federated data source manager functional code is executed by a computer system including one or more processors configured to execute federated database manager functional program code, with the federated database manager functional program code configured to receive a logical query to an updated federated database where the updated federated database includes a legacy federated database of data sources and an added data source not included in the legacy federated database, where the federated database manager functional program code aggregates data sources in the updated federated database into a logical model and generates a physical execution plan to implement the logical query, where the federated database manager functional program code includes a code generation functional component that processes the physical execution plan to produce physical queries in native form to communicate with data sources in the legacy federated database, and where the federated database manager functional program code includes a framework functional component for interfacing with a data source cartridge functional component associated with the added data source, with the federated database manager functional program code, when executed by the one or more processors, causing the computer system to perform the steps of retrieving metadata from the data source cartridge functional component, generating, using at least a portion of the metadata retrieved from the data source cartridge functional component, the physical execution plan for the logical query with the physical execution plan including at least one logical query to the added data source, branching the at least one logical query to the added data source to the framework functional component which converts a branched logical query to an extensible markup language (XML) representation and transferring the XML representation to the data source cartridge functional component which processes the XML representation to produce a physical query in native form to the added data source.

In an example embodiment a federated data source manager functional code is executed by a computer system including one or more processors configured to execute federated database manager functional program code, with the federated database manager functional program code configured to receive a logical query to an updated federated database where the updated federated database includes a legacy federated database of data sources and an added data source not included in the legacy federated database, where the federated database manager functional program code aggregates data sources in the updated federated database into a logical model, where the federated database manager functional program code includes an administrative tool functional component having a file layer representing tables and columns of data sources in the legacy federated database, and where the federated database manager functional program code includes a framework functional component for interfacing with a data source cartridge functional component associated with the added data source, with the federated database manager functional program code, when executed by the one or more processors, causing the computer system to perform the steps of retrieving, by the framework functional component, metadata of the added data source from the data source cartridge functional component, updating, by the administrative tool functional component, the file layer to include the metadata of the added data source and presenting, by the administrative tool functional component, tables and columns of data sources included in both the legacy federated database and the added data source.

A further understanding of the nature and the advantages of particular embodiments disclosed herein may be realized by reference to the remaining portions of the specification and the attached drawings.

DETAILED DESCRIPTION OF EMBODIMENTS

Although the description has been described with respect to particular embodiments thereof, these particular embodiments are merely illustrative, and not restrictive.

Figure 1:
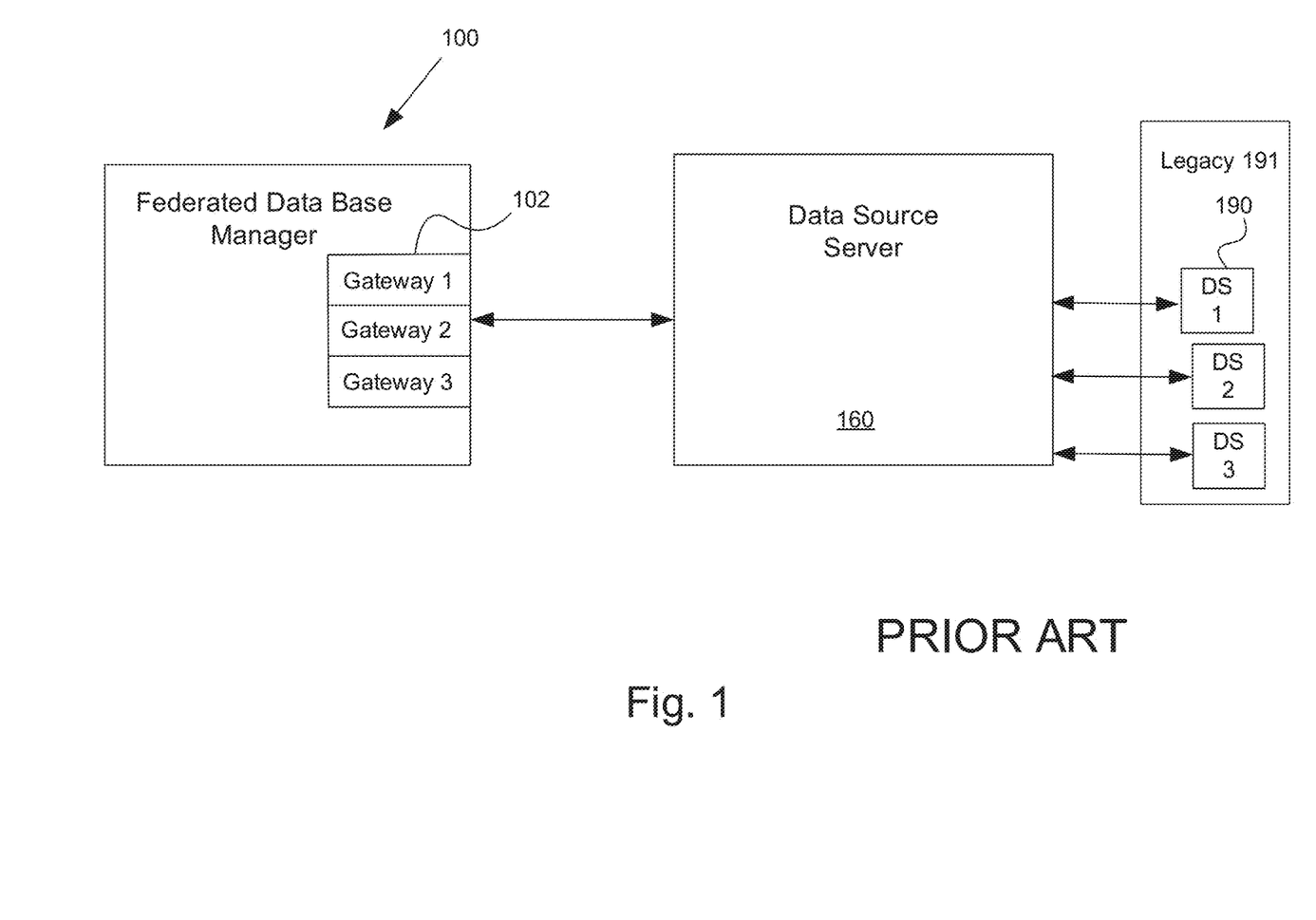
FIG. 1 is a block diagram illustrating an example prior art federated database manager.

FIG. 1 is a block diagram of a conventional federated database server system. In this example, the federated database manager 100 includes a separate gateway 102 associated with each separate physical data source included in the federated database. A data source server 160 provides connections to the physical data sources 190.

The federated database manager 100 creates a logical or virtual database structure that abstracts the multiple data sources and allows logical queries to the logical database structure. The federated database manager 100 includes an analytics component that converts a logical query into a physical plan that is used to query the physical data sources. A gateway uses the physical plan to generate the physical query for its associated physical data source. The gateway also includes a connection or connection pool to communicate with its associated data source.

The analytics component requires information regarding the features supported by each physical data source in order to create the logical query. These features are maintained in files stored on the federated database manager 100.

The federated database manager 100 is a software component and federation of a new data source to a legacy federated database 191 requires substantial rewriting of the federated database manager software component 100.

For example, to add a Java data source required rewritten code to add a new database type and/or connection pool type, to define database features, to add a new gateway, to rewrite/transform the physical plan and execution code generation, to add a java host service using the target Java API for the data source, to import metadata and to add a tool to configure the user interface.

The connection pool includes connections to specific data sources. If the newly added data source is a Java data source then code to implement a Java Database Connectivity (JDBC) connector and a JDBC driver specific to the new data source is added to the federated database manager software component 100. The connector executes the queries to the newly added data source.

The federated database manager software component 100 includes a hard coded file storing the feature tables of the target data source types that are included in the legacy federated database. Adding a new data source requires rewriting the file to add the feature table of the newly added data source.

The code generator is hard-coded to generate physical queries for the target data source types included in the legacy federated database. Adding a new data source type requires rewriting the code generator to be able to generate physical queries for the newly added data source.

The rewritten federated database manager 100 capable of federating the new data source into the legacy federated database is typically released as a new version.

Figure 2:
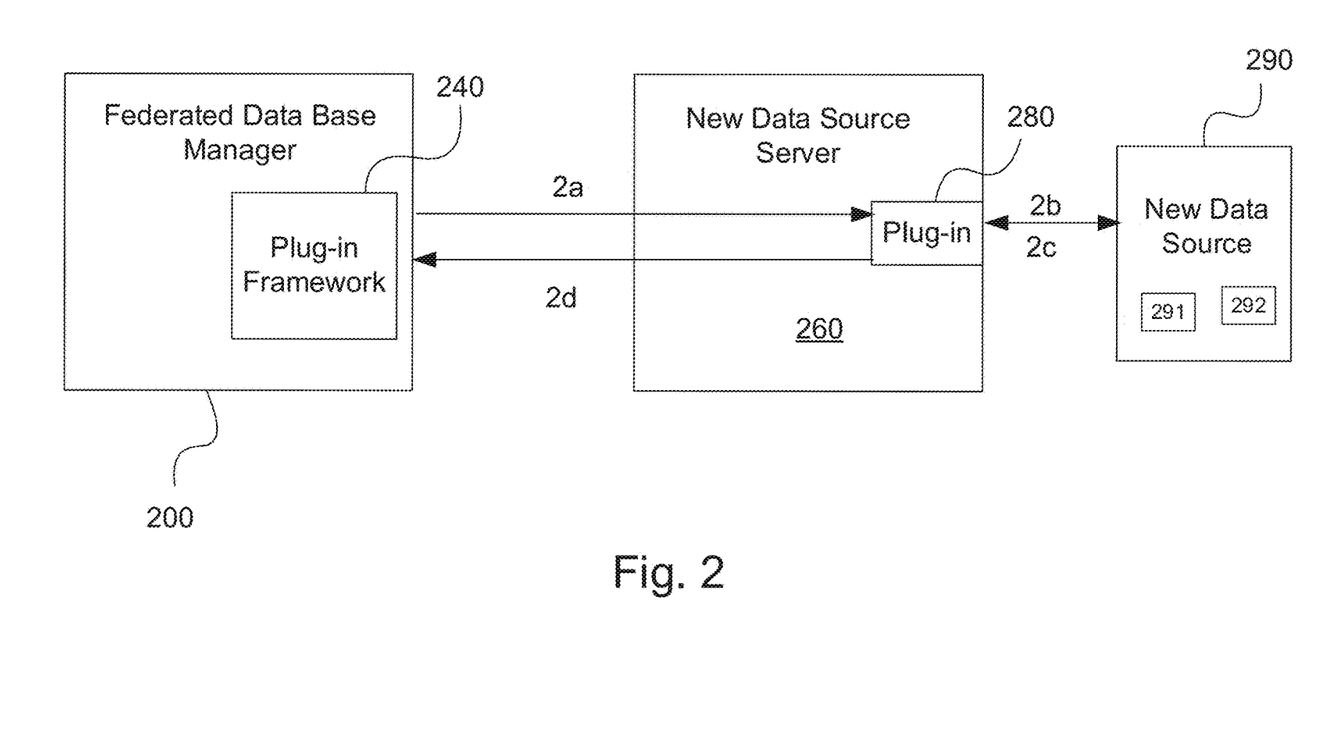
FIG. 2 is a block diagram illustrating an example embodiment of a federated database including a plug-in architecture for adding new data sources and data source connections.

FIG. 2 is a block diagram of an example embodiment that provides a plug-in architecture to allow adding new data sources to a legacy federated database without rewriting code of the federated database manager software component.

In FIG. 2 the federated database manager 200 includes a plug-in framework module 240 and the data source server 260 includes a data source cartridge plug-in 280 associated with a new data source 290.

The data source cartridge plug-in 280 provides metadata including a feature table 421A of the associated data source and configuration parameters 421B to the plug-in framework module. The framework supports adding the new database and/or connection pool type, features and configuration parameters and allows the new database types and/or connection pool types to be shown to a user using an administration tool. The metadata supplied by the data source cartridge is used by the analytics engine to generate a physical execution plan including the newly added data source.

The data source cartridge also implements the connectors and drivers required to generate physical queries to the newly added data source so that the coding of the execution components of the federated database manager software component 200 do not need to be rewritten. The physical execution plan is provided to the data source cartridge by the framework and the data source cartridge generates physical queries in the physical execution plan targeted to the newly added data source.

Accordingly, as depicted in FIG. 2, the metadata is used by an analytics component of the federated database manager 200 to create a physical execution plan. A part of the physical execution plan is provided by the plug-in framework 240 to the data source cartridge plug-in 280 (arrow 2a) and the data source cartridge plug-in 280 generates the physical query for its associated data source (arrow 2b). The data source cartridge plug-in 280 then returns the result set and result set metadata to the data base manager using the plug-in framework 240 (arrows 2c and 2d).

In this example embodiment, the addition of a new data source requires the addition of only a new data source cartridge plug-in 280. The new data source cartridge plug-in 280 is compatible with the existing plug-in framework 240 and provides the metadata necessary for the analytics engine to generate a physical plan that includes the newly added data source and executes the physical queries to the newly added data source.

The embodiment depicted in FIG. 2 requires that the federated database manager software component be rewritten once to add code implementing the plug-in framework. Once this version of the federated database manager software component has been written the data source cartridges for new data sources are designed to be compatible with the plug-in framework. New data sources can now be added to the legacy federated database by developing new data source cartridges without the need to modify the code of the federated database manager software component.

Figure 3:
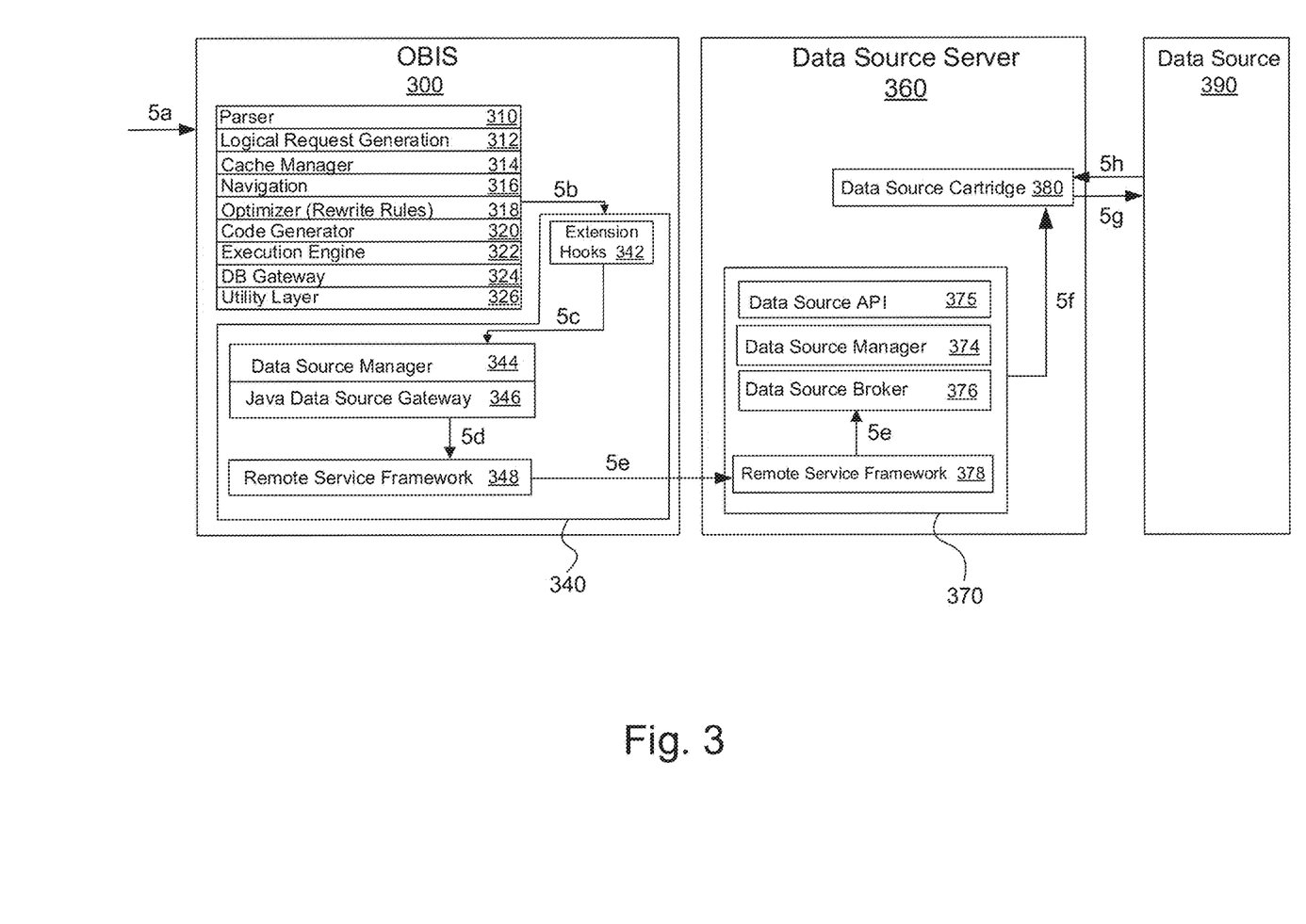
FIG. 3 is a block diagram illustrating an example embodiment of a federated database including a plug-in architecture for adding new data sources and data source connections based on the architecture of the Oracle Business Intelligence Server.

FIG. 3 is a block diagram of a detailed example embodiment of a plug-in architecture that supports, in a timely manner, adding new data sources in a federated database environment. The present example of the plug-in architecture will be described by way of example, not limitation, as a system that leverages the OBIS analytics optimization engine. Accordingly, FIG. 3 illustrates an overview of the architecture of a java data source framework.

In this example embodiment, the OBIS and the data source server are coded in different programming languages. The OBIS is coded in C++ and the data source server is coded in Java. Due to this fact, various components of the plug-in interface are overlapped in the OBIS and the data source server.

Referring to FIG. 3, block 300 depicts the functional components of the OBIS and block 340 depicts components added to the OBIS to form a plug-in framework. The functional components of blocks 300 and 340 are programmed using C++ and the left side of FIG. 1 is referred to at the C++ side. Block 360 is a data source server, block 370 depicts functional components of the plug-in framework on the data source server 360, block 380 is the data source cartridge and block 390 is the newly added data source associated with the data source cartridge 380. The data source server functional elements are programmed in the Java programming language and the right side of FIG. 1 is referred to as the Java side.

The example embodiment depicted in FIG. 3 includes component names that are overlapped in the C++ and Java sides due to the nature of remote services using proxy and stub components between the C++ and Java sides.

The operation of the functional blocks of the OBIS will now be described to assist in understanding the plug-architecture.

At a simplified level, the internal layers of OBIS have two primary functions: (A) compile incoming logical query requests into executable code, and (B) execute the code. Query compilation is composed of the following five phases: (1) parsing, (2) logical request generation, (3) navigation, (4) rewrites, and (5) code generation. The final output of the query compiler is executable code. This code is passed to the execution engine that is then responsible for executing the code in parallel.

In the first compilation phase, the multi-threaded parser functional component 310 accepts a logical SQL which is a subset of a full ANSI SQL compliant syntax (including sub-queries, derived tables, set operations, etc.) and generates a parse tree as its output.

Subsequently, the logical request generation component 312 is responsible for instantiating the inferred aggregation in the simplified SQL supported by the OBIS.

The navigation and optimizer rewrite functional components 316 and 318 do the bulk of the work in compiling a query. The output of these two major functional components is an execution plan that is then fed into the code generation phase.

The navigator functional component 316 is responsible for the "content-aware" data federation capabilities, such as partitioning by source, partitioning by value range, and aggregate navigation. The input to the navigator functional component 316 is a logical request tree describing the precise semantics of the requested data while its output is the initial physical execution plan. The navigator functional component 316 exploits knowledge of content to eliminate the predominant majority of traditional multi-database joins. It also has built-in support for common business analytics such as time series comparisons, shares, and dimension-specific aggregation rules.

Once the navigator functional component 316 generates the initial physical execution plan, the optimizer/rewrite functional component 318 of the compiler is responsible for distributed relational query optimization and optimal native SQL or MDX generation. This phase of compilation covers (i) multi-database join plan generation; (ii) Function shipping; (iii) functional compensation analysis; and (iv) optimized SQL or MDX generation. The OBIS optimizer functional component 318 further supports federated lookup tables allowing disparate systems to lookup values across one another and merge results on the fly.

The code generation functional component 320 is responsible for producing the native query processing language directives to communicate with heterogeneous, remote databases (i.e., physical SQL or MDX generation) included in the legacy federated database. It is also responsible for generating the code for any remaining query processing that has not been function shipped to remote databases. This includes the insertion of parallel execution directives for the analytics execution engine.

As described above, in the OBIS the code generator is programmed in C++ and is configured to provide native query processing language to the data sources in the legacy federated database. Adding new data sources requires reprogramming of the C++ code generator.

The OBIS execution engine 322 is a parallel SQL execution engine extended with analytical execution operators. Some of the functions performed are shipping directives for native SQL or MDX query strings, directives to execute one or more aggregation passes and directives for various types of filters to the source database, submission of multiple queries to be submitted and executed in parallel, perhaps on different machines, joining or merging two or more result sets from several parallel queries and ranking and filtering rows efficiently.

The gateway functional component 324 is a dynamically loaded library that can be configured to run within the OBIS process itself or in an external process. Individual adapters have been built to communicate with relational database systems, OLAP sources and XML data sources.

The functional components of the plug-in framework 340 implemented on the C++ side are programmed in C++ and added to the OBIS code to form a plug-in enabled BI server (PIEBIS). As described above, in existing systems the server must be reprogrammed each time a new data source is added to the legacy federated database. In contrast, once the plug-in framework is programmed, the PIEBIS will be able to use a plug-in programmed for a new data source or connection type without further modification.

The extension hooks functional elements 342 provide extension points to the java data source adaptor framework. When using a data source cartridge, code generation for the added data source is performed by the data source cartridge and code generation for data sources included in the legacy federated database is performed by the code generation functional component 320. The part of the physical execution plan directed to added data sources which are serviced by data source cartridges branches from the code generation functional element 320 to the extension hooks The extension hook functional elements transform the added data sources part of the physical execution plan into an XML file that encodes the structure and nodes of that part of the physical execution plan.

The data source manager functional component 344 is an OBIS side stub that talks to the Java data source manager 374 on the data source server 360. The data source manager functional component 344 includes methods for locating a data source and obtaining a data source feature table from the data source cartridge. The Java data source manager functional component 344 utilizes the XML plan provided by the extension hook functional element to construct a Java side execution plan.

The Java data source gateway functional component 346 implements the gateway interface using the Remote Service Framework 348. The Java data source gateway functional component 346 is responsible for all interactions including generating codes and executing queries with the data source cartridges. The Java data source gateway functional component serializes the Java side execution plan to send to the data source server through the Remote Service Framework.

Remote Service Framework functional component 348 is a RPC framework that abstracts the underlying runtime model using protocols and transports abstractions. The protocol is the abstraction of wire format that is transmitted and the transport is the abstraction of stream service that is transmitting the requests and replies.

The Java side framework functional elements 370 of the data source server 360 will now be described. The data source server hosts and manages the framework and the data source cartridge functional elements. In an example embodiment, the data source server runs as a Servlet in a J2EE application server such as Oracle WebLogic Server and can be deployed as a WebLogic Web application (e.g., a war file). However, an actual implementation will abstract out the physical server environment so that there is no limitation in terms of the hosting environment and wire format.

The data source manager functional component 374 manages Java data sources and provides dynamic database types and database features. The data source manager manages the lifecycle of data source cartridges including deployment of the data source cartridge and starting and stopping the operation of the data source cartridge.

The Java data source functional component API 375 is the set of interface and base implementation classes that is used in defining a Java data source. The API extends the capabilities of the OBIS by using the plug-in framework and allows a new data source to be plugged in, using the data source cartridge functional component 380, without needing to modify OBIS code.

The Remote Service Framework functional component is a RPC framework that abstracts the underlying runtime model using protocols and transports abstractions. This functional component is the counterpart of the RPC framework functional component 348 on the C++ side.

The data source broker functional component 376 handles the data source request and routes the request to the data source cartridge. The data source broker functional component 376 listens to service requests from the OBIS and routes each request to the designated data source cartridge to perform data source related operations.

The data source cartridge functional component 380 is the actual component that implements Java data source API. The data source cartridge functional component 380 extends the capabilities of the OBIS by implementing the data source cartridge API 375. It is a mechanism that allows a new data source to be plugged into the OBIS without needing to modify the OBIS code.

A data source cartridge is a Java archive (JAR) that package all the class files and required settings files for the cartridge that is loaded and hosted by the data source server. The data source cartridge functional component is responsible for generating the physical query to the added data source based on the XML execution plan provided by the extension hook functional component and execution mechanism to run the generated physical query to the actual data source.

Figure 4A:
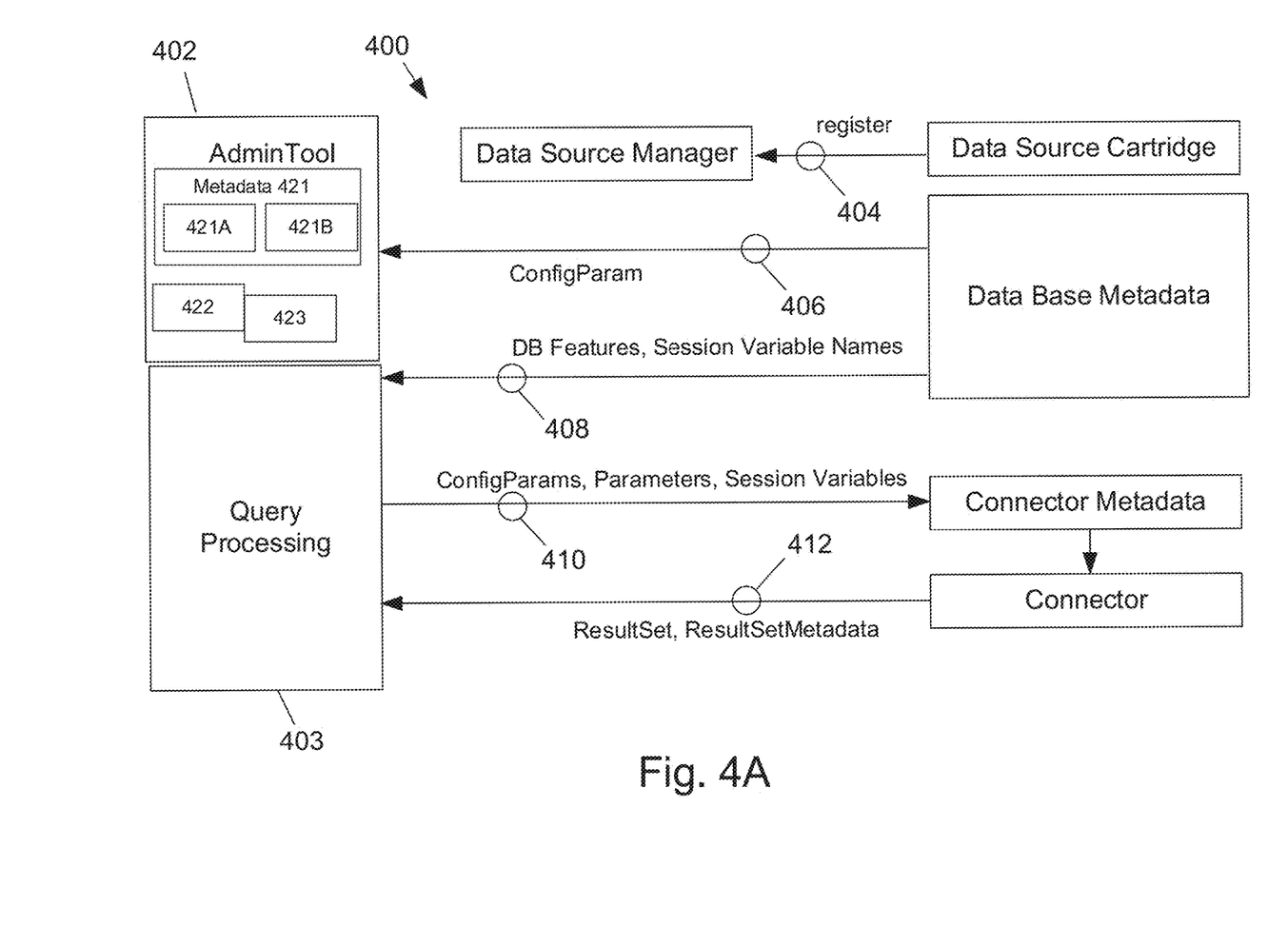
FIG. 4A is a block diagram illustrating the data flow of the example embodiment illustrated in FIG. 3.

FIG. 4A depicts an overview of the data flow 400 between the OBIS and a data source cartridge functional component. Blocks on the left side of FIG. 4 represent functional components of and processes performed by the OBIS and blocks on the right side represent functional components of, data provided by and processes performed by the data source cartridge functional component.

In this embodiment the OBIS includes an Administrative Tool 402 that is a windows application that allows an administrator to create and edit repositories. A main window displays a physical pane 422 that presents the physical structure of the data sources to which the OBIS submits queries. Also displayed are logical 423 and presentation panes. The query processing block represents processes performed by the OBIS analytics engine.

Information about the data sources is stored in a file with the extension ".rpd" which contains data definitions and business rules known as "metadata." The RPD file is composed of three tiers known as "layers."

The first layer is the physical layer that represents the actual tables 291 and columns 292 of a data source. It also contains the connection definition to that data source and has join definitions including primary and foreign keys.

The second layer is the business model mapping layer that starts to simplify the model that is defined in the physical layer and business logic is added.

The third layer is the presentation layer that presents the tables 191, 291 and columns 192, 292 to end users. The main purpose of the presentation layer is to organize content for users in a way that is most meaningful.

In process step 404 the data source cartridge functional component registers with the data source manager.

In process step 406 the framework supports providing database metadata and connector metadata and associated configuration parameters for database types and connector types parameters for the new data source from the data source cartridge functional component to the administration tool. This allows the RPD file to be updated with new data source type and metadata to be shown and used by the administration tool. Accordingly, the framework and administrative tool are configured to be compatible with new data source cartridge functional components developed for new data sources to be federated.

Figure 4B:
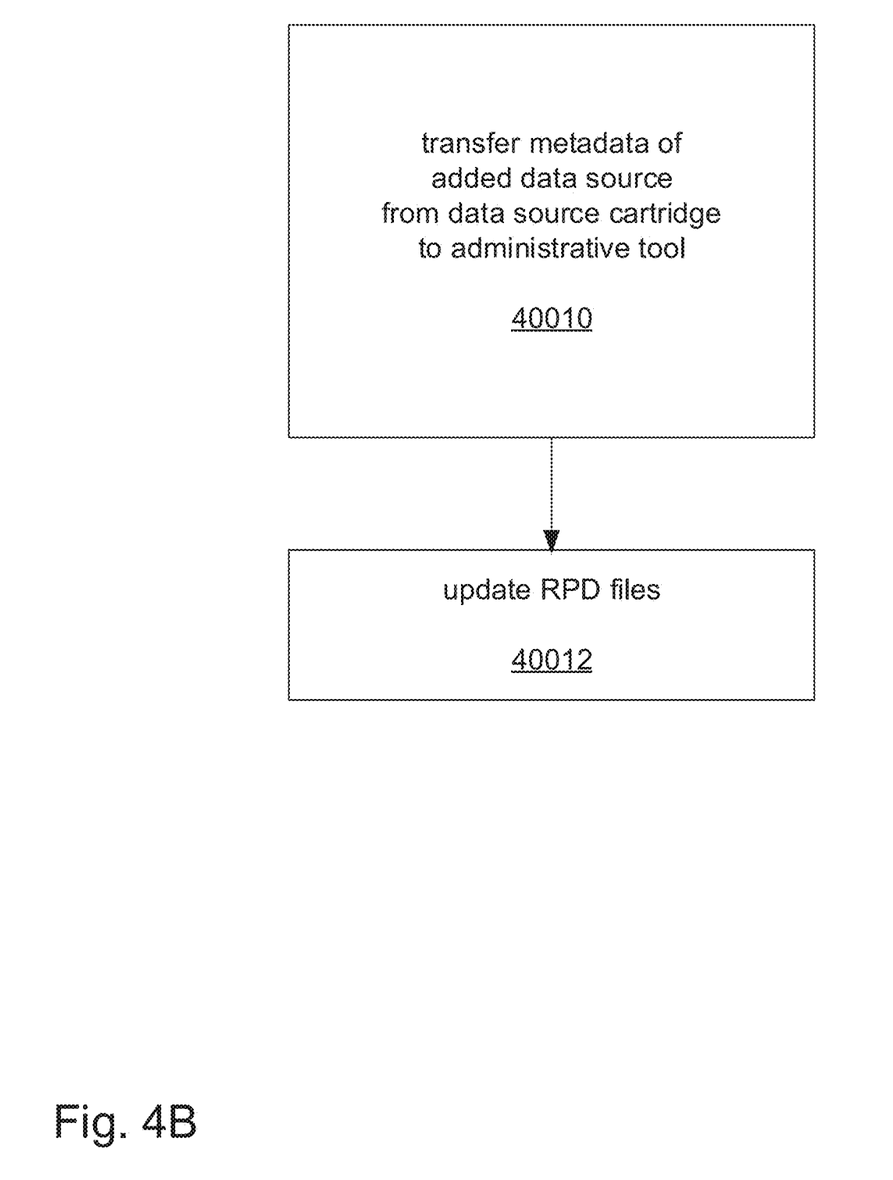
FIG. 4B is a flow chart illustrating the operation of the administrative tool.

FIG. 4B depicts the steps required to present information relating to an updated federated database including the legacy federated database and a new data source.

In process step 40010 the framework transfers metadata 431 of an added data source from a data source cartridge to the administration tool through the data source manager.

In process step 40012 the administrative tool updates the RPD files with the added data source if a user uses the newly added data source.

Returning to FIG. 4A, in process step 408 query processing in the OBIS uses database features provided by the framework from the data source cartridge functional component when optimizing a query.

In process step 410 the configuration parameters, parameters and session variables are passed by the framework to the data source cartridge functional component to enable preparing a physical query to the associated data source connected to the data source cartridge functional component.

In process step 412 the result set, and result set resulting from executing a physical query is passed by the framework from the data source cartridge functional component to the query processing process 403.

Figure 5:
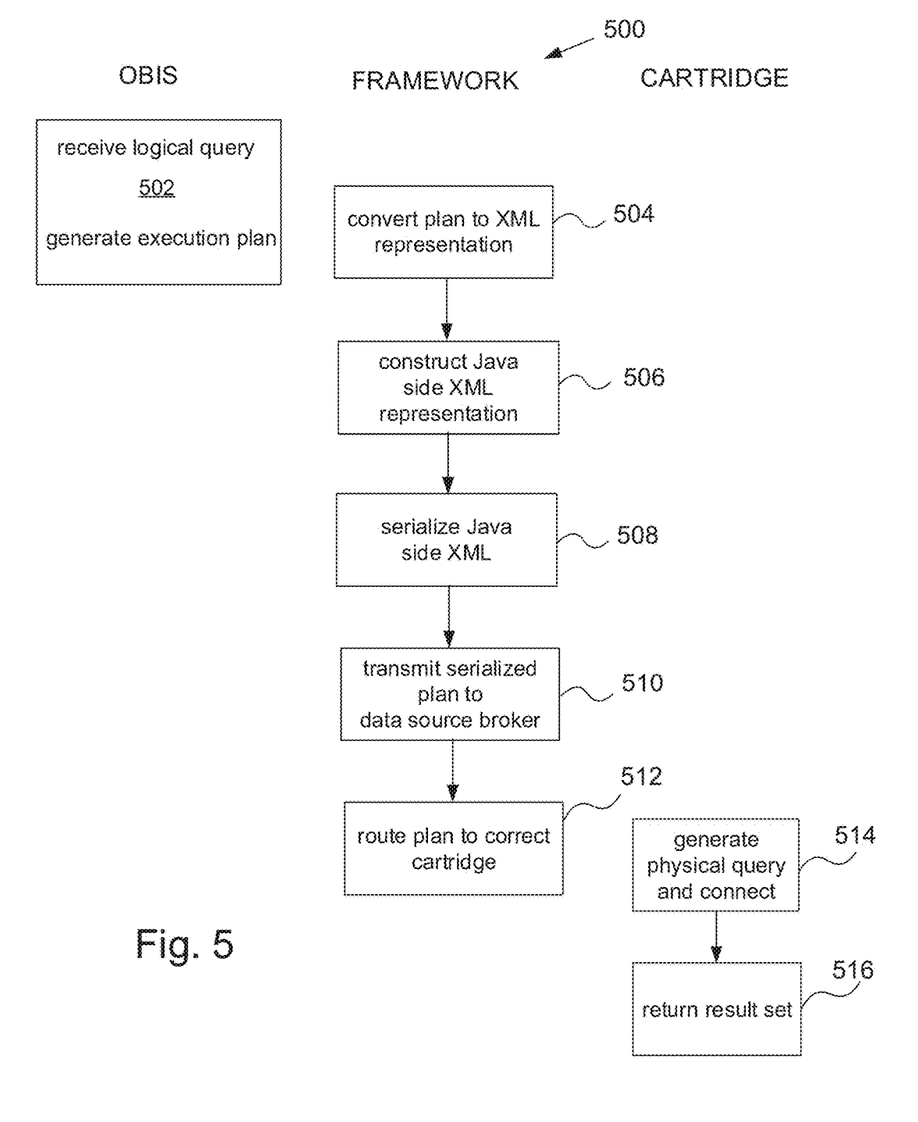
FIG. 5 is a flow diagram illustrating acts performed by the example embodiment of FIG. 3 to implement a query including a newly added data source or data source connection.

FIG. 5 is a flow chart 500 illustrating the steps performed to execute a logical query to the newly added data source using the plug-in architecture depicted in FIG. 3. FIG. 5 depicts steps performed by the OBIS, the plug-in framework and the data source cartridge functional component.

In process step 502 (arrow 5a of FIG. 3) the OBIS receives a logical query for processing and employs the OBIS analytic optimizer engine, i.e., the parser, logical request generation, cache manager, navigator and optimizer) of the OBIS to generate the physical execution plan.

In process step 504 (arrow 5b of FIG. 3) the added data source part of the physical execution plan branches from the code generation functional element 302 to the extension hooks functional element 342.

The part of the physical execution plan that targets the data sources in the legacy federated database by the OBIS is processed by the code generation functional element 302 to generate physical SQL for the fixed set of data sources.

Thus, for the added data sources part of the physical execution plan, the code generation functional component and execution engine programmed into the OBIS are bypassed and the functions of these components are performed by the data source cartridge.

In process step 506 (arrow 5c of FIG. 3) the XML representation of the physical plan is used by the data source manager 344 to construct a Java side XML representation of the physical execution plan.

In process step 508 (arrow 5d of FIG. 3) the Java Data Source gateway serializes the Java side XML representation of the physical execution plan.

In process step 510 (arrow 5e of FIG. 3) the Remote Service Framework transmits the serialized Java side XML representation of the physical execution plan to the data source broker on the data source server.

In process step 512 (arrow 5f of FIG. 3) the data source broker routes a data source request to the correct data source cartridge servicing the physical data source that provides the data.

In process step 514 (arrow 5g of FIG. 3) the data source cartridge generates a physical query to its associated data source and implements the connector for the physical data source.

In process step 516 (arrow 5h of FIG. 3) the result set is returned to the data source cartridge.

In another embodiment, the plug-in framework is utilized to support a connection pool cartridge which adds a new connection pool type to the OBIS without requiring reprogramming the OBIS.

A new connection pool type is propagated from the connection pool plug-in, using the plug-in framework described above, to the administrative tool of the OBIS so that the new connection pool type can be used in constructing physical execution plans.

In many instances a federated database manager is programmed to use an Open Database Connectivity (ODBC) as an API for accessing a database management system. However, Java applications use the Java Database Connectivity (JDBC) API to access the database management system. One example of a connectivity plug-in adds the JDBC API to a federated database manager so the Java applications can use JDBC to access the database management system.

Figure 6:
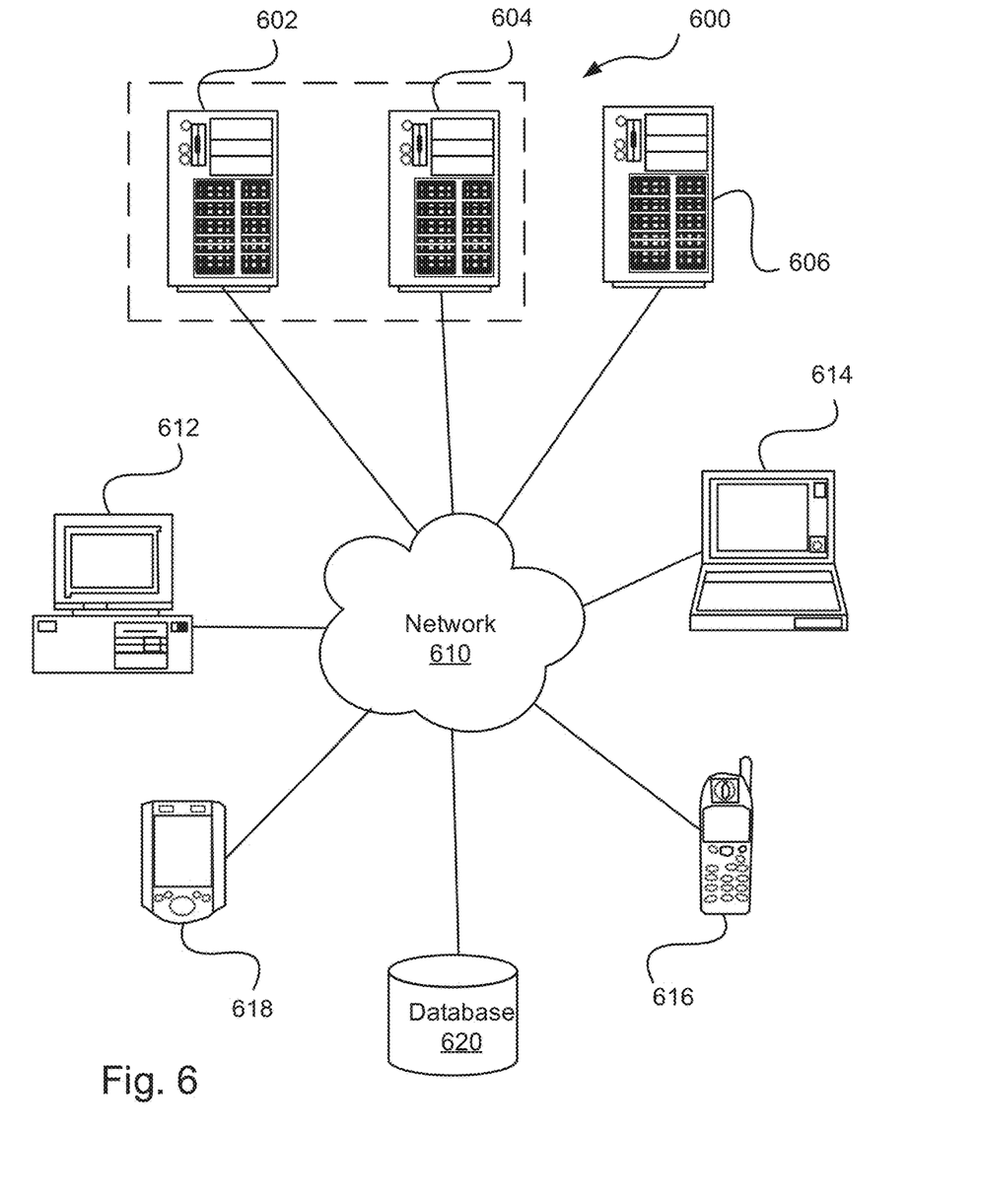
FIG. 6 is a block diagram illustrating components of an example operating environment in which various embodiments of the present invention may be implemented.

FIG. 6 is a block diagram illustrating components of an example operating environment in which various example embodiments may be implemented. The system 600 can include one or more user computers, computing devices, or processing devices 612, 614, 616, 618, which can be used to operate a client, such as a dedicated application, web browser, etc. The user computers 612, 614, 616, 618 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 612, 614, 616, 618 may also have any of a variety of applications, including one or more development systems, database client and/or server applications, and Web browser applications. Alternatively, the user computers 612, 614, 616, 618 may be any other electronic device, such as a thin-client computer, Internet-enabled gaming system, and/or personal messaging device, capable of communicating via a network (e.g., the network 610 described below) and/or displaying and navigating Web pages or other types of electronic documents. Although the example system 600 is shown with four user computers, any number of user computers may be supported.

In most embodiments, the system 600 includes some type of network 610. The network may be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 602, 604, 606 which can be general purpose computers, specialized server computers (including, merely by way of example, data source servers, PC servers, UNIX servers, mid-range servers, mainframe computers rack-mounted servers, etc.), server farms, server clusters, or any other appropriate arrangement and/or combination. One or more of the servers (e.g., 606) may be dedicated to running applications, such as a business application, a Web server, application server, etc. Such servers may be used to process requests from user computers 612, 614, 616, 618. The applications can also include any number of applications for controlling access to resources of the servers 602, 604, 606.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 612, 614, 616, 618. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 612, 614, 616, 618.

The system 600 may also include one or more databases 620. The database(s) 620 may reside in a variety of locations. By way of example, a database 620 may reside on a storage medium local to (and/or resident in) one or more of the computers 602, 604, 606, 612, 614, 616, 618. Alternatively, it may be remote from any or all of the computers 602, 604, 606, 612, 614, 616, 618, and/or in communication (e.g., via the network 610) with one or more of these. In a particular set of embodiments, the database 620 may reside in a storage-area network ("SAN") familiar to those skilled in the art. Similarly, any necessary files for performing the functions attributed to the computers 602, 604, 606, 612, 614, 616, 618 may be stored locally on the respective computer and/or remotely, as appropriate. In one set of embodiments, the database 620 may be a relational database, such as Oracle 10g, that is adapted to store, update, and retrieve data in response to SQL-formatted commands.

Figure 7:
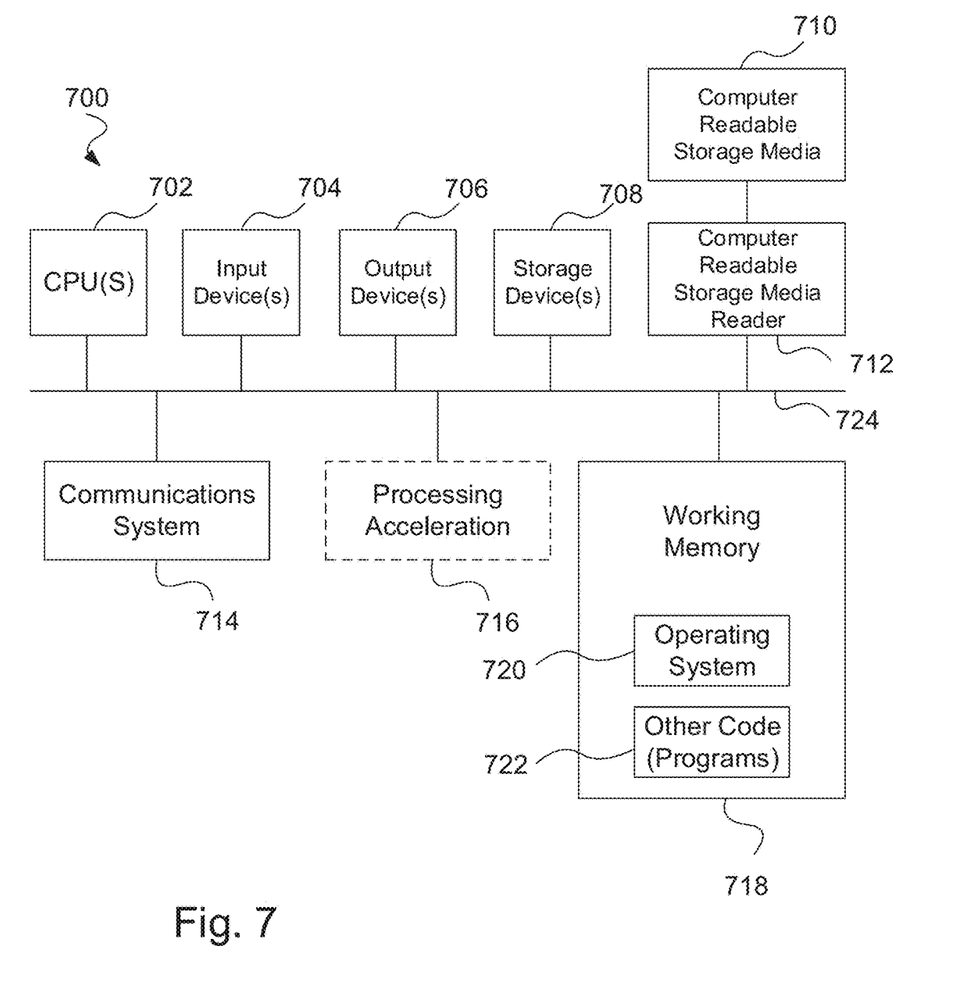
FIG. 7 illustrates an example computer system in which various embodiments of the present invention may be implemented.

FIG. 7 illustrates an example computer system 700, in which various example embodiments may be implemented. The system 700 may be used to implement any of the computer systems described above. The computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). The computer system 700 may also include one or more storage devices 708. By way of example, the storage device(s) 708 can include devices such as disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 712, a communications system 714 (e.g., a modem, a network card (wireless or wired), an infra-red communication device, etc.), and working memory 718, which may include RAM and ROM devices as described above. In some embodiments, the computer system 700 may also include a processing acceleration unit 716, which can include a digital signal processor DSP, a special-purpose processor, and/or the like.

The computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing computer-readable information. The communications system 714 may permit data to be exchanged with the network and/or any other computer described above with respect to the system 700.

The computer system 700 may also comprise software elements, shown as being currently located within a working memory 718, including an operating system 720 and/or other code 722, such as an application program (which may be a client application, Web browser, mid-tier application, RDBMS, etc.). It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a non-transitory computer readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices and field programmable gate arrays. Optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine readable medium to permit a computer to perform any of the methods described above.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material within the essential scope and spirit.

We claim:

1. A method performed by a federated database manager functional component executed by a computer system, where the federated database manager functional component includes a code generation functional component and a framework functional component, the method comprising:
    receiving, by the federated database manager functional component, a logical query to an updated federated database where the updated federated database includes a legacy federated database of data sources and an added data source not included in the legacy federated database;
    retrieving, by the framework functional component, metadata from a data source cartridge functional component associated with the added data source, wherein the metadata includes a feature table and configuration parameters of a plug-in framework model and wherein a different type of data source cartridge functional component is used for different types of added data sources;
    generating, by the federated database manager functional component and using at least a portion of the metadata retrieved from the data source cartridge functional component, a physical execution plan for the logical query with the physical execution plan including at least one logical query to the added data source;
    processing, by the code generation functional component, the physical execution plan to produce physical queries in native form to communicate with data sources in the legacy federated database;
    branching, by the federated database manager functional component, the at least one logical query to the added data source to the framework functional component which converts a branched logical query to an extensible markup language (XML) representation; and
    transferring, by the framework functional component, the XML representation to the data source cartridge functional component which processes the XML representation to produce a physical query in native form to the added data source.

2. The method of claim 1 further comprising:
    receiving, by the federated database manager functional component and from the data source cartridge functional component, a result set from the physical query to the added data source.

3. A computer system including one or more processors configured to execute federated database manager functional program code, where the federated database manager functional program code includes a code generation functional component and a framework functional component, with the federated database manager functional program code, when executed by the one or more processors, causing the computer system to perform the steps of:
    receiving, by the federated database manager functional program code, a logical query to an updated federated database where the updated federated database includes a legacy federated database of data sources and an added data source not included in the legacy federated database;
    retrieving, by the framework functional component, metadata from a data source cartridge functional component associated with the added data source, wherein the metadata includes a feature table and configuration parameters of a plug-in framework model and wherein a different type of data source cartridge functional component is used for different types of added data sources;
    generating, by the federated database manager functional program code and using at least a portion of the metadata retrieved from the data source cartridge functional component, a physical execution plan for the logical query with the physical execution plan including at least one logical query to the added data source;
    processing, by the code generation functional component, the physical execution plan to produce physical queries in native form to communicate with data sources in the legacy federated database;
    branching, by the federated database manager functional program code, the at least one logical query to the added data source to the framework functional component which converts a branched logical query to an extensible markup language (XML) representation; and
    transferring, by the framework functional component, the XML representation to the data source cartridge functional component which processes the XML representation to produce a physical query in native form to the added data source.

4. The computer system of claim 3 with the federated database manager functional program code, when executed by the one or more processors, further causing the computer system to perform the step of:
    receiving, from the data source cartridge functional component, a result set from the physical query to the added data source.

5. A method performed by a federated database manager functional component executed by a computer system, where an updated federated database includes a legacy federated database of data sources and an added data source not included in the legacy federated database, where, the method comprising:
    providing the federated database manager functional component that includes an administrative tool functional component having a file layer representing tables and columns of data sources in the legacy federated database and a framework functional component;
    retrieving, by the framework functional component, metadata of the added data source from a data source cartridge functional component associated with the added data source wherein a different type of data source cartridge functional component is used for different types of added data sources;

updating, by the administrative tool functional component, the file layer to include the metadata of the added data source; and presenting, by the administrative tool functional component, tables and columns of data sources included in both the legacy federated database and the added data source.

6. The method of claim 5 with presenting further comprising:

presenting, by the administrative tool functional component, a physical presentation pane, depicting the physical structure of the updated federated database.

7. The method of claim 5 with presenting further comprising:

presenting, by the administrative tool functional component, a logical presentation pane depicting the logical structure of the updated federated database.

8. A computer system including one or more processors configured to execute federated database manager functional program code, where an updated federated database includes a legacy federated database of data sources and an added data source not included in the legacy federated database, where the federated database manager functional program code includes an administrative tool functional component having a file layer representing tables and columns of data sources in the legacy federated database and a framework functional component, with the federated database manager functional program code, when executed by the one or more processors, causing the computer system to perform the steps of:

retrieving, by the framework functional component, metadata of the added data source from a data source cartridge functional component associated with the added data source;

updating, by the administrative tool functional component, the file layer to include the metadata of the added data source; and presenting, by the administrative tool functional component, tables and columns of data sources included in both the legacy federated database and the added data source.

9. The computer system of claim 8 with the federated database functional code, when executed by the one or more processors, causing the computer to perform the step of:

presenting, by the administrative tool functional component, a physical presentation pane depicting the physical structure of the updated federated database.

10. The computer system of claim 8 with the federated database manager functional program code, when executed by the one or more processors, further causing the computer system to perform the step of:

presenting, by the administrative tool functional component, a logical presentation pane depicting the logical structure of the updated federated database.

11. One or more non-transitory computer readable storage media storing federated database manager functional program code for execution by one or more processors, where the federated database manager functional program code includes a code generation functional component and a framework functional component, where the federated database manager functional program code, when executed by the one or more processors, performs the following acts:

receiving, by the federated database manager functional program code, a logical query to an updated federated database where the updated federated database includes a legacy federated database of data sources and an added data source not included in the legacy federated database;

retrieving, by the framework functional component, metadata from a data source cartridge functional component associated with the added data source, wherein the metadata includes a feature table and configuration parameters of a plug-in framework model and wherein a different type of data source cartridge functional component is used for different types of added data sources;

generating, by the federated database manager functional program code and using at least a portion of the metadata retrieved from the data source cartridge functional component, a physical execution plan for the logical query with the physical execution plan including at least one logical query to the added data source;

processing, by the code generation functional component, the physical execution plan to produce physical queries in native form to communicate with data sources in the legacy federated database;

branching, by the federated database manager functional program code, the at least one logical query to the added data source to the framework functional component which converts a branched logical query to an extensible markup language (XML) representation; and transferring, by the framework functional component, the XML representation to the data source cartridge functional component which processes the XML representation to produce a physical query in native form to the added data source.

* * * * *

UNITED STATES PATENT AND TRADEMARK OFFICE
CERTIFICATE OF CORRECTION

PATENT NO. : 10,108,744 B2
APPLICATION NO. : 14/675628
DATED : October 23, 2018
INVENTOR(S) : Park et al.

Page 1 of 1

It is certified that error appears in the above-identified patent and that said Letters Patent is hereby corrected as shown below:

In the Specification

In Column 1, Line 14, delete "2015," and insert -- 2018, --, therefor.

In Column 7, Line 7, after "hooks" insert -- . --.

In the Claims

In Column 15, Line 2, in Claim 5, delete "source" and insert -- source, --, therefor.

Signed and Sealed this
Thirty-first Day of December, 2019

Andrei Iancu
*Director of the United States Patent and Trademark Office*